United States Patent
Chen et al.

(10) Patent No.: US 11,755,307 B2
(45) Date of Patent: Sep. 12, 2023

(54) STORAGE CIRCUIT AND OPERATION METHOD

(71) Applicant: Realtek Semiconductor Corporation, Hsinchu (TW)

(72) Inventors: Rong Chen, Suzhou (CN); Wen-Juan Ni, Suzhou (CN); Hao Zhou, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 142 days.

(21) Appl. No.: 17/203,913

(22) Filed: Mar. 17, 2021

(65) Prior Publication Data

US 2021/0294590 A1 Sep. 23, 2021

(30) Foreign Application Priority Data

Mar. 19, 2020 (CN) .......................... 202010196053.0

(51) Int. Cl.
G06F 9/445 (2018.01)
G06F 8/65 (2018.01)

(52) U.S. Cl.
CPC ...................................... *G06F 8/65* (2013.01)

(58) Field of Classification Search
CPC ....................................................... G06F 8/65
See application file for complete search history.

(56) References Cited

U.S. PATENT DOCUMENTS

| 11,176,254 B2* | 11/2021 | Singer | G06F 11/0757 |
| 11,687,332 B2* | 6/2023 | Matsui | H04L 67/34 |
| | | | 717/172 |
| 2014/0189673 A1* | 7/2014 | Stenfort | G06F 9/445 |
| | | | 717/170 |
| 2022/0405090 A1* | 12/2022 | Veluswamy | G06F 8/654 |

FOREIGN PATENT DOCUMENTS

TW 200937290 A 9/2009

* cited by examiner

*Primary Examiner* — Chuck O Kendall
(74) *Attorney, Agent, or Firm* — Locke Lord LLP; Tim Tingkang Xia, Esq.

(57) ABSTRACT

A storage circuit includes a first storage region, a second storage region, a third storage region, and a fourth storage region. The first storage region stores first firmware data. The second storage region stores second firmware data. The third storage region stores first state data corresponding to the first firmware data. The fourth storage region stores second state data corresponding to the second firmware data. One of the first firmware data and the second firmware data is executed based on the first state data and the second state data. In a situation that the first firmware data is executed, the second firmware data is updated if a firmware updating event occurs.

20 Claims, 6 Drawing Sheets

FLAG

| ISP | VERIFY | SWITCH | RUN |
|---|---|---|---|
| 0xAA : updated successfully | 0xAA : verified successfully | 0xAA : switch code is received successfully/ run tag RUN is recorded and modified successfully | 0xFF : can be executed |
| 0xFF : not updated successfully | 0x55 : not verified successfully | 0xAF : switch code is received successfully/ run tag RUN is not recorded and modified successfully | 0x55 : cannot be executed |
| | 0xFF : not verified | 0xFF : switch code is not received | |

FIG. 2

| | ISP | VERIFY | SWITCH | RUN | state |
|---|---|---|---|---|---|
| condition1 | 0xFF | X | X | X | illegal |
| condition2 | | 0xFF | X | X | wait-for-verification |
| condition3 | | 0x55 | X | X | illegal |
| condition4 | | 0xFF->0xAA | 0xFF | X | wait-for-switch-code |
| condition5 | 0xAA | | 0xFF | X | illegal |
| condition6 | | 0xAA | 0xAF | X | to-execute-switch-code |
| condition7 | | | 0xAA | 0x55 | invalid |
| condition8 | | | | 0xFF | valid |
| condition9 | | | other | other | illegal |
| condition10 | | other | X | X | illegal |
| condition11 | | | X | X | illegal |
| condition12 | other | X | X | X | illegal |

FIG. 3

| state of FW1 | state of FW2 | state of BOOT | |
|---|---|---|---|
| wait-for-verification | X | wait-for-verification | firmware data FW1 |
| wait-for-switch-code | X | wait-for-switch-code | firmware data FW1 |
| to-execute-switch-code | X | to-execute-switch-code | firmware data FW1 |
| X | wait-for-verification | wait-for-verification | firmware data FW2 |
| X | wait-for-switch-code | wait-for-switch-code | firmware data FW2 |
| X | to-execute-switch-code | to-execute-switch-code | firmware data FW2 |
| valid | valid | to-execute-firmware-data | firmware data FW1/FW2 |
| valid | illegal/invalid | to-execute-firmware-data | firmware data FW1 |
| illegal/invalid | valid | to-execute-firmware-data | firmware data FW2 |
| illegal/invalid | illegal/invalid | to-execute-boot-data | boot data BOOT |

STORAGE CIRCUIT AND OPERATION METHOD

RELATED APPLICATIONS

This application claims priority to Chinese Application Serial Number 202010196053.0, flied Mar. 19, 2020, which is herein incorporated by reference.

BACKGROUND

Technical Field

The present disclosure relates to a storage circuit and an operation method. More particularly, the present disclosure relates to a storage circuit and an operation method for updating first firmware and second firmware by turns.

Description of Related Art

With developments of technology, various electrical devices have been applied to many fields. An electrical device can perform a specific function by executing the corresponding firmware data. The electrical device can perform one or more new functions or modifies errors in the previous version by updating the firmware data and executing the updated firmware data.

SUMMARY

One embodiment of the present disclosure is related to a storage circuit. The storage circuit includes a first storage region, a second storage region, a third storage region, and a fourth storage region. The first storage region stores first firmware data. The second storage region stores second firmware data. The third storage region stores first state data corresponding to the first firmware data. The fourth storage region stores second state data corresponding to the second firmware data. One of the first firmware data and the second firmware data is executed based on the first state data and the second state data. In a situation that the first firmware data is executed, the second firmware data is updated if a firmware updating event occurs.

One embodiment of the present disclosure is related to an operation method. The operation method includes following steps: generating first state data corresponding to first firmware data; generating second state data corresponding to second firmware data; executing one of the first firmware data and the second firmware data based on the first state data and the second state data; and in a situation that the first firmware data is executed, updating the second firmware data if a firmware updating event occurs.

As the above embodiments, in the storage circuit and the operation method of the present disclosure, the first firmware data and the second firmware data have adjacent versions respectively. Thus, it can prevent that the first firmware data changes drastically if the first firmware data is recovered by the second firmware data, to improve the user experience.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a schematic diagram illustrating a data structure of state data according to some embodiments of the present disclosure.

FIG. 3 is a schematic diagram illustrating state data according to some embodiments of the present disclosure.

FIG. 4 is a schematic diagram illustrating a state of first firmware data, a state of second firmware data, and a state of boot data according to some embodiments of the present disclosure.

DETAILED DESCRIPTION

Figure 1:
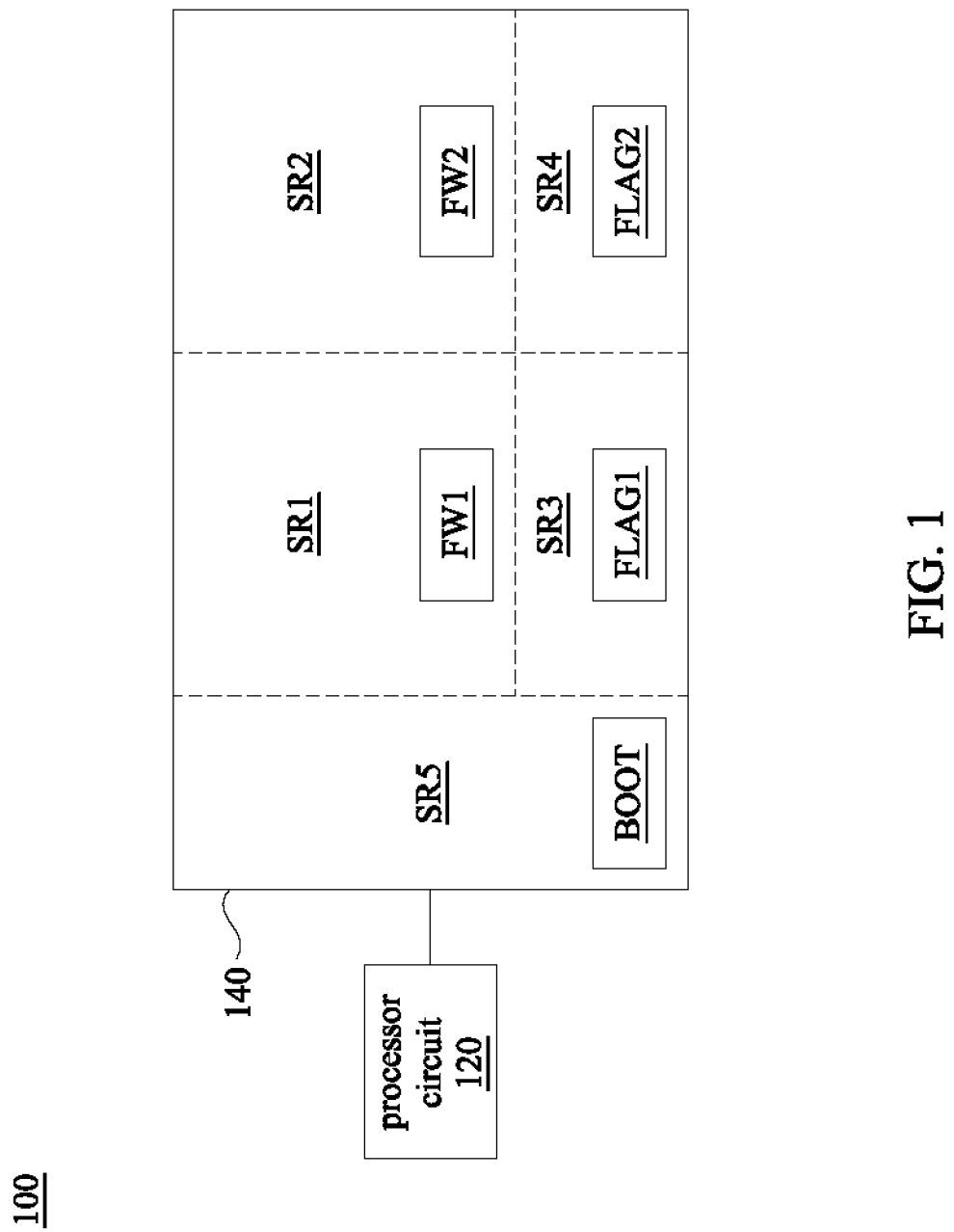
FIG. 1 is a schematic diagram illustrating an electrical device according to some embodiments of the present disclosure.

Reference is made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating an electrical device 100 according to some embodiments of the present disclosure. As illustrated in FIG. 1, the electrical device 100 includes a processor circuit 120 and a storage circuit 140. In some embodiments, the processor circuit 120 may be implemented by a central processor, a micro-processor, or other elements having a processing function or a control function. In some embodiments, the storage circuit 140 may be implemented by a flash memory. The processor circuit 120 is coupled to the storage circuit 140. In operation, the processor circuit 120 can process or control data stored in the storage circuit 140.

The implementations of the processor circuit 120 and the storage circuit 140 above are merely for illustration, and various implementations of the processor circuit 120 and the storage circuit 140 are within the contemplated scopes of the present disclosure.

As illustrated in FIG. 1, the storage circuit 140 includes storage regions SR1-SR5. The storage region SR1 is configured to store firmware data FW1. The storage region SR2 is configured to store firmware data FW2. The electrical device 100 can execute the firmware data FW1 or the firmware data FW2, to perform one or more functions. In addition, the firmware data FW1 or the firmware data FW2 can be updated, such that the electrical device 100 performs the one or more new functions or modify errors in the previous version. In the present disclosure, the firmware data FW1 and the firmware data FW2 can be updated by turns. Details about how the firmware data FW1 and the firmware data FW2 are updated by turns are described in following paragraphs. The storage region SR3 is configured to store a state (state data FLAG1) of the firmware data FW1. The storage region SR4 is configured to store a state (state data FLAG2) of the firmware data FW2. The storage region SR5 is configured to store boot data BOOT.

In operation, when the electrical device 100 is powered on, the processor circuit 120 can read the boot data BOOT and execute the boot data BOOT, to read the state data FLAG1 and the state data FLAG2, to determine the state of the firmware data FW1 and the state of the firmware data FW2 so as to determine a boot state (for example, a state of the boot data BOOT in FIG. 4). One of the firmware data FW1 or the firmware data FW2 is executed based on the boot state.

As described above, the firmware data FW1 and the firmware data FW2 are updated by turns. For example, at the beginning, the version of the firmware data FW1 is the same to the version of the firmware data FW2. When the firmware data FW1 is executed, the firmware data FW2 is updated if a firmware updating event occurs. Thus, compared to the firmware data FW2, the firmware data FW1 has a previous version. If the firmware data FW2 is updated successfully, then the updated firmware data FW2 is executed. Alternatively, if the firmware data FW2 is not updated successfully, the firmware data FW1 is still executed. If the firmware updating event occurs again after a period of time, the firmware data FW2 is updated again. Similarly, at the beginning, the version of the firmware data FW1 is the same to the version of the firmware data FW2. When the firmware data FW2 is executed, the firmware data FW1 is updated if a firmware updating event occurs. Thus, compared to the firmware data FW1, the firmware data FW2 has a previous version. If the firmware data FW1 is updated successfully, then the updated firmware data FW1 is executed. Alternatively, if the firmware data FW1 is not updated successfully, the firmware data FW2 is still executed. If the firmware updating event occurs again after a period of time, the firmware data FW1 is updated again. Based on the descriptions above, the firmware data FW1 and the firmware data FW2 have adjacent versions respectively.

In some related approaches, if firmware updating events occur at two different time points, the system updates one firmware data (for example, user firmware data), and another firmware data (for example, boot firmware data) is maintained to be initial values. If the user firmware data is not updated successfully, the system is started up by the boot firmware data, to recover the user firmware data to be initial values (the user firmware data is recovered to be the boot firmware data). In these related approaches, the version of the user firmware data is very different from the version of the boot firmware data if the system is updated continuously. Accordingly, if the user firmware data is recovered to be the initial values (the user firmware data is recovered to be the boot firmware data), it affects the functions of the system drastically and thus affect the user experience.

Compared to the related approaches above, the firmware data FW1 and the firmware data FW2 of the present disclosure are updated by turns. In other words, the firmware data FW1 and the firmware data FW2 have adjacent versions respectively. In this situation, it can avoid that the version of the firmware data FW1 is very different from the version of the firmware data FW2, to improve user experience.

Reference Is made to FIG. 2. FIG. 2 is a schematic diagram illustrating a data structure of state data FLAG according to some embodiments of the present disclosure. As illustrated in FIG. 2, the state data FLAG includes an update tag ISP, a verify tag VERIFY, a switch code tag SWICTH, and a run tag RUN. In some embodiments, each of the update tag ISP, the verify tag VERIFY, the switch code tag SWICTH, and the run tag RUN is one byte, but the present disclosure is not limited thereto.

The embodiment of each of the update tag ISP, the verify tag VERIFY, the switch code tag SWICTH, and the run tag RUN as one byte is taken as an example and described in following paragraphs.

As illustrated in FIG. 2, the update tag ISP corresponds to two legal values. If the update tag ISP is 0xAA, it indicates that the corresponding firmware data is updated successfully. If the update tag ISP is 0xFF, it indicates that the corresponding firmware data is not updated successfully.

The verify tag VERIFY corresponds to three legal values. If the verify tag VERIFY is 0xAA, it indicates that the digital sign of the corresponding firmware data is verified successfully. If the verify tag VERIFY is 0x56, it indicates that the digital sign of the corresponding firmware data is not verified successfully. If the verify tag VERIFY is 0xFF, it indicates that the digital sign of the corresponding firmware data has not been verified.

The switch code tag SWICTH corresponds to three legal values. If the switch code tag SWICTH is 0xAA, it indicates that the switch code is received successfully and the corresponding run tag RUN is recorded/modified successfully. If the switch code tag SWICTH is 0xAF, it indicates that the switch code is received successfully but the corresponding run tag RUN is not recorded/modified successfully. If the switch code tag SWICTH is 0xFF, it indicates that the switch code is not received.

The run tag RUN corresponds to two legal values. If the run tag RUN is 0xFF, it indicates that the corresponding firmware can be executed. If the run tag RUN is 0x55. It Indicates that the corresponding firmware cannot be executed.

In some embodiments, the state of the firmware data FW1 is determined based on the update tag ISP, the verify tag VERIFY, the switch code tag SWICTH, and the run tag RUN of the state data FLAG1. The state of the firmware data FW2 is determined based on the update tag ISP, the verify tag VERIFY, the switch code tag SWICTH, and the run tag RUN of the state data FLAG2. In some embodiments, if the firmware data FW1 is updated, the state data FLAG1 is erased. To be more specific, all tags of the state data FLAG1 are modified to be 0xFF. Then, the firmware data FW1 is updated. When the updating is finished, the update tag ISP of the state data FLAG1 is modified to be 0xAA, and other tags are maintained to be 0xFF. In some embodiments, the other tags are modified by executing the boat data BOOT. The operations of updating the firmware data FW2 are similar to the descriptions above, so they are not described herein again.

References are made to FIG. 2 and FIG. 3. FIG. 3 is a schematic diagram illustrating state data according to some embodiments of the present disclosure. The state data FLAG1 is taken as an example in FIG. 3. As described above, the state data FLAG2 is similar to the state data FLAG1, so it is not described herein again. In FIG. 3, the determination order is the update tag ISP, the verify tag VERIFY, the switch code tag SWICTH, and the run tag RUN.

In a condition 1, the update tag ISP is 0xFF. It indicates that the firmware data FW1 is not updated successfully if the update tag ISP is 0xFF. Accordingly, the condition 1 indicates that the firmware data FW1 is in an illegal state.

In a condition 2, the update tag ISP is 0xAA, and the verify tag VERIFY is 0xFF. It indicates that the firmware data FW1 is updated successfully if the update tag ISP is 0xAA, and it indicates that the firmware data FW1 has not been verified if the verify tag VERIFY is 0xFF. Accordingly, the condition 2 indicates that the firmware data FW1 is in a wait-for-verification state.

In a condition 3, the update tag ISP is 0xAA, and the verify tag VERIFY is 0x55. It indicates that the firmware data FW1 is updated successfully if the update tag ISP is 0xAA, and it indicates that the firmware data FW1 is not verified successfully if the verify tag VERIFY is 0x55. Accordingly, the condition 3 indicates that the firmware data FW1 is in an illegal state.

In a condition 4, the update tag ISP is 0xAA, the verify tag VERIFY is changed from 0xFF to 0xAA, and the switch code tag SWICTH is 0xFF. It indicates that the firmware data FW1 is updated successfully if the update tag ISP is 0xAA, it indicates that the firmware data FW1 is just verified successfully if the verify tag VERIFY is changed from 0xFF to 0xAA, and it indicates that the switch code is not received if the switch code tag SWICTH is 0xFF. Accordingly, the condition 4 Indicates that the firmware data FW1 is in a wait-for-switch-code state.

In a condition 5, the update tag ISP is 0xAA, the verify tag VERIFY is 0xAA, and the switch code tag SWICTH is 0xFF. It indicates that the firmware data FW1 is updated successfully if the update tag ISP is 0xAA, it indicates that the firmware data FW1 is verified successfully if the verify tag VERIFY is 0xAA, and it indicates that the switch code is not received if the switch code tag SWICTH is 0xFF. Accordingly, the condition 5 indicates that applications in upper layers do not need to execute the firmware data FW1 and the firmware data FW1 is in an illegal state.

In a condition 6, the update tag ISP is 0xAA, the verify tag VERIFY is 0xAA, and the switch code tag SWICTH is 0xAF. It indicates that the firmware data FW1 is updated successfully if the update tag ISP is 0xAA, it indicates that the firmware data FW1 is verified successfully if the verify tag VERIFY is 0xAA, and it indicates that the switch code is received successfully but the run tag RUN is not recorded and modified successfully if the switch code tag SWICTH is 0xAF. Accordingly, the condition 6 indicates that the firmware data FW1 is in a to-execute-switch-code state to modify the run tag RUN and the switch code tag SWITCH. In some embodiments, the switch code is executed without waiting a next power-on process. In some other embodiments, the switch code is executed after the system is powered on in a next time.

In a condition 7, the update tag ISP is 0xAA, the verify tag VERIFY is 0xAA, the switch code tag SWICTH is 0xAA, and the run tag RUN is 0x55. It indicates that the firmware data FW1 is updated successfully if the update tag ISP is 0xAA, it indicates that the firmware data FW1 is verified successfully if the verify tag VERIFY is 0xAA, it indicates that the switch code is received successfully and the run tag RUN is recorded successfully and modified successfully if the switch code tag SWICTH is 0xAA, and it indicates that the firmware data FW1 cannot be executed if the run tag RUN is 0x55. Accordingly, the condition 7 indicates that the firmware data FW1 is in an invalid state.

Compared to the condition 7, the run tag RUN is 0xFF in a condition 8. It indicates that the firmware data FW1 can be executed if the run tag RUN is 0xFF. Accordingly, the condition 8 Indicates that the firmware data FW1 is in a valid state.

Compared to the condition 8, the run tag RUN of a condition 9 is other illegal value. Accordingly, the condition 9 indicates that the firmware data FW1 is in an illegal state.

In a condition 10, the switch code tag SWICTH is other illegal value. Accordingly, the condition 10 indicates that the firmware data FW1 is in an illegal state.

In a condition 11, the verify tag VERIFY is other illegal value. Accordingly, the condition 11 indicates that the firmware data FW1 is in an illegal state.

In a condition 12, the update tag ISP is other illegal value. Accordingly, the condition 12 indicates that the firmware data FW1 is in an illegal state.

Reference Is made to FIG. 4. FIG. 4 is a schematic diagram illustrating the state of first firmware data FW1, the state of second firmware data FW2, and the state of boot data BOOT according to some embodiments of the present disclosure. As illustrated in FIG. 4, when the state of the firmware data FW1 (the firmware data FW2) is the wait-for-verification state, the state of the boot data BOOT is the wait-for-verification state and a verify process is executed on the firmware data FW1 (the firmware data FW2). When the state of the firmware data FW1 (the firmware data FW2) is the wait-for-switch-code state, the state of the boot data BOOT is the wait-for-switch-code state and the boot data BOOT is executed to wait for the switch code. When the state of the firmware data FW1 (the firmware data FW2) is the wait-for-switch-code state, the state of the boot data BOOT is the wait-for-switch-code state. To be more specific, the switch code tag SWICTH of the firmware data FW1 is modified to be 0xAF first, and the run tag RUN of the firmware data FW2 is modified to be 0x55. Then, the switch code tag SWICTH of the firmware data FW1 is modified to be 0xAA. It indicates that the switch code is received successfully and complete executing switch code process. When the states of the firmware data FW1 and the firmware data FW2 are the valid states, one of the firmware data FW1 and the firmware data FW2 is executed. For example, the firmware data having a new version is executed. When the state of one of the firmware data FW1 and the firmware data FW2 is the valid state and the state of another one of the firmware data FW1 and the firmware data FW2 is the illegal state or the invalid state, the state of the boot data BOOT is a to-execute-firmware-data state and the firmware data having the valid state is executed. When the states of both of the firmware data FW1 and the firmware data FW2 are the illegal states or the invalid states, the state of the boot data BOOT is a to-execute-boot-data state and the boot data BOOT is executed.

Figure 5:
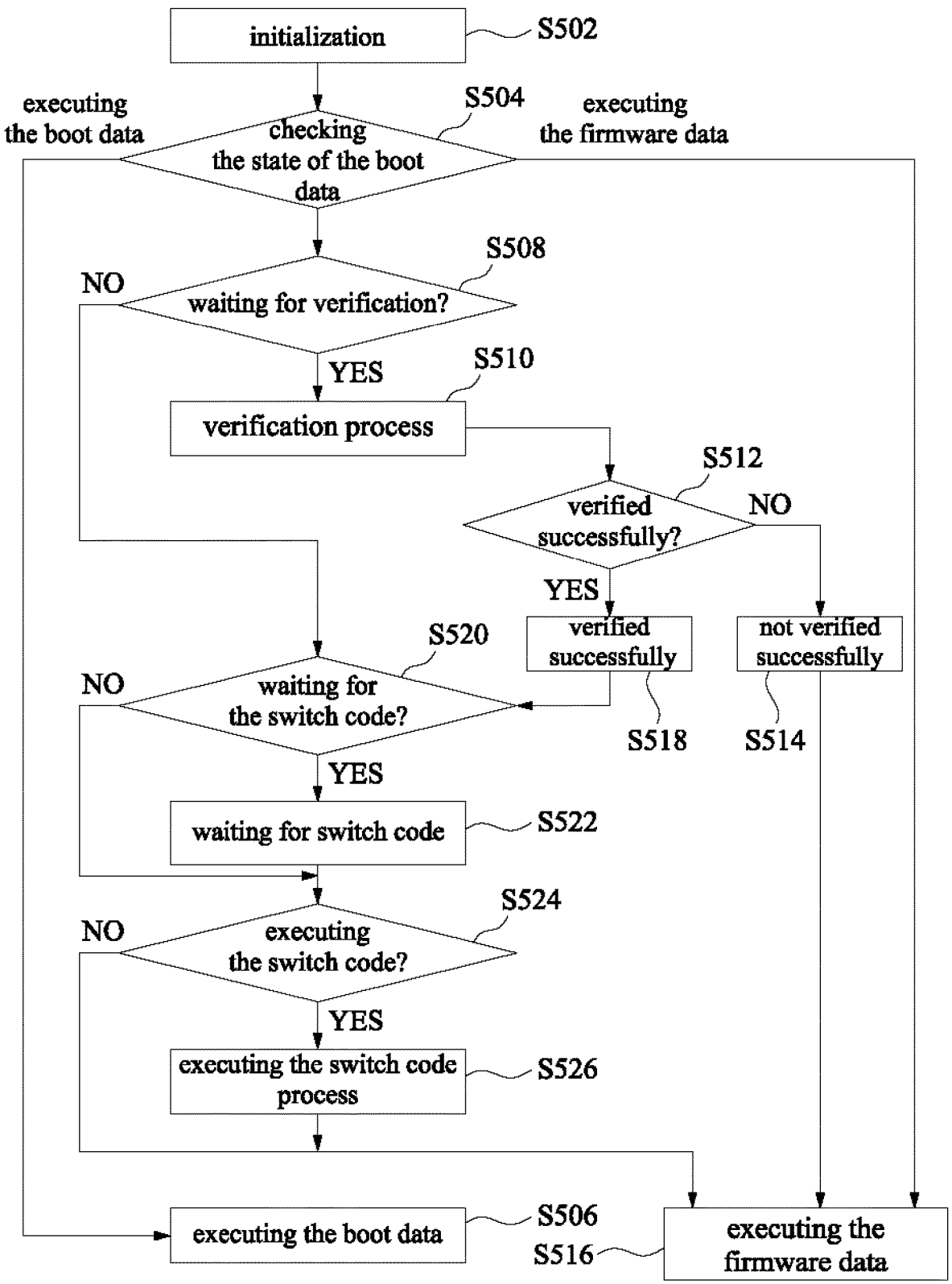
FIG. 5 is a flow diagram illustrating an operation method according to some embodiments of the present disclosure.

Reference is made to FIG. 5. FIG. 5 is a flow diagram illustrating an operation method 500 according to some embodiments of the present disclosure. The operation method 500 includes operations S502, S504, S506, S508, S510, S512, S514, S516, S518, S520, S522, S524, and S526. In some embodiments, the operation method 500 is applied to the electrical device 100 in FIG. 1, but the present disclosure is not limited thereto. For ease of understanding, the operation method 500 is discussed with reference to FIG. 1-FIG. 4.

In operation S502, an initialization process is executed, to complete various setting. In operation S504, the state of the boot data BOOT is determined. If the state of the boot data BOOT is the to-execute-boot-data state, the operation method 500 goes to the operation S506. In operation S506, the boot data BOOT is executed.

If the state of the boot data BOOT is the to-execute-firmware-data state in operation S504, the operation method 500 goes to the operation S516. In operation S516, the firmware data FW1 or the firmware data FW2 is executed.

If the state of the boot data BOOT is not the to-execute-the-boot-data state and not the to-execute-firmware-data state in operation S504, the operation method 500 goes to the operation S508.

In operation S508, it is determined whether the state of the boot data BOOT is the wait-for-verification. If yes, the operation method 500 goes to the operation S510 to execute a verification process. If not, the operation method 500 goes to the operation S520.

Then, the operation method 500 goes to the operation S512, to determine whether the verification process is executed successfully. If not, the operation method 500 goes to the operation S514 to modify the verify tag VERIFY of the state data FLAG to be 0x55 and modify the state of the boot data BOOT to be the to-execute-firmware-data state. Then, the operation method 500 goes to the operation S516 to execute the corresponding firmware data. If yes, the operation method 500 goes to the operation S518 to modify the verify tag VERIFY of the state data FLAG to be 0xAA and modify the state of the boot data BOOT to be the wait-for-switch-code state.

Then, the operation method 500 goes to the operation S520 again. In operation 520, it is determined whether the state of the boot data BOOT is the wait-for-switch-code state. If not, the operation method 500 goes to the operation S524. If yes, the operation method 500 goes to the operation S522, to execute the wait-for-switch-code process and modify the state of the boot data BOOT to be the to-execute-switch-code state.

Then, the operation method 500 goes to the operation S524. In operation S524, it is determined whether the state of the boot data BOOT is the to-execute-switch-code state. If not, the operation method 500 goes to the operation S516 to execute the corresponding firmware data. If yes, the operation method 500 goes to the operation S526, to execute the execute-switch-code process. Then, the operation method 500 goes to the operation S516 to execute the corresponding firmware data.

As the descriptions above, in some embodiments, the storage circuit 140 is implemented by a flash memory. In these embodiments, the data (for example, the state data FLAG in FIG. 2) in the storage circuit 140 is modified toward a single direction (each bit is modified from 1 to 0) by the operations above. Accordingly, it can avoid multiple erase processes and multiple writing processes.

Figure 6:
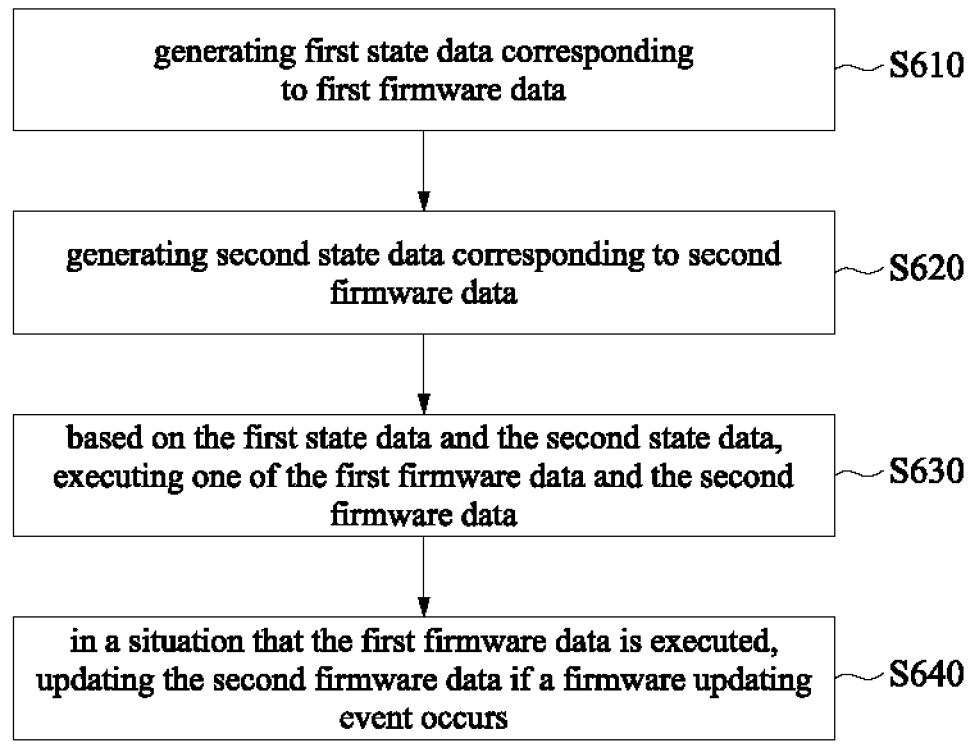
FIG. 6 is a flow diagram illustrating an operation method according to some embodiments of the present disclosure.

Reference is made to FIG. 6. FIG. 6 is a flow diagram illustrating an operation method 600 according to some embodiments of the present disclosure. The operation method 600 includes operations S610, S620, S630, and S640. In some embodiments, the operation method 600 is applied to the electrical device 100 in FIG. 1, but the present disclosure is not limited thereto. For ease of understanding, the operation method 600 is described with reference to FIG. 1-FIG. 4.

In operation S610, the state data FLAG1 corresponding to the firmware data FW1 is generated. In some embodiments, the state data FLAG1 includes the update tag ISP, the verify tag VERIFY, the switch code tag SWICTH, and the run tag RUN, to reflect the state of the firmware data FW1.

In operation S620, the state data FLAG2 corresponding to the firmware data FW2 is generated. In some embodiments, the state data FLAG2 includes the update tag ISP, the verify tag VERIFY, the switch code tag SWICTH, and the run tag RUN, to reflect the state of the firmware data FW2.

In operation S630, based on the state data FLAG1 and the state data FLAG2, it is determined to execute the firmware data FW1 or the firmware data FW2. In some embodiments, based on the state data FLAG1 and the state data FLAG2, the boot state (for example, the state of the boot data BOOT in FIG. 4) is determined. It is determined to execute the firmware data FW1 or the firmware data FW2 based on the state of the boot data BOOT.

In operation S640, when the firmware data FW1 is executed, the firmware data FW2 is updated if a firmware updating event occurs. In some embodiments, the firmware data FW1 and the firmware data FW2 have adjacent versions respectively.

The above description of the operation method 600 includes exemplary operations, but the operations of the operation method 600 are not necessarily performed in the order described. The order of the operations of the operation method 600 disclosed in the present disclosure are able to be changed, or the operations are able to be executed simultaneously or partially simultaneously as appropriate, in accordance with the spirit and scope of various embodiments of the present disclosure.

As the above embodiments, in the storage circuit and the operation method of the present disclosure, the first firmware data and the second firmware data have adjacent versions respectively. Thus, it can prevent that the first firmware data changes drastically if the first firmware data is recovered by the second firmware data, to improve the user experience.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A storage circuit, comprises:
    a first storage region configured to store first firmware data;
    a second storage region configured to store second firmware data;
    a third storage region configured to store first state data corresponding to the first firmware data; and
    a fourth storage region configured to store second state data corresponding to the second firmware data, wherein one of the first firmware data and the second firmware data is executed based on the first state data and the second state data,
where in a situation that the first firmware data is executed, the second firmware data is updated when a firmware updating event occurs, and
wherein the updated second firmware data is executed after the second firmware data is updated, and the first firmware data is updated when another firmware updating event occurs.

2. The storage circuit of claim 1, wherein the first firmware data is still executed if the second firmware data is not updated successfully.

3. The storage circuit of claim 1, wherein each of the first state data and the second state data comprises an update tag, a verify tag, a switch code tag, and a run tag.

4. The storage circuit of claim 3, wherein a first state of the first firmware data is determined based on the update tag, the verify tag, the switch code tag, and the run tag of the first state data, wherein a second state of the second firmware data is determined based on the update tag, the verify tag, the switch code tag, and the run tag of the second state data.

5. The storage circuit of claim 4, further comprising:
a fifth storage region configured to store boot data, wherein a boot state is determined based on the first state data and the second state data, wherein it is determined to execute the first firmware data or the second firmware data based on the boot state.

6. The storage circuit of claim 5, wherein one of the first firmware data and the second firmware data is executed if each of the first state and the second state is in a valid state.

7. The storage circuit of claim 5, wherein the first firmware data is executed if the first state is a valid state and the second state is an invalid state or an illegal state.

8. The storage circuit of claim 5, wherein the boot state is changed from a wait-for-verification state to a wait-for-switch-code state if the boot state is the wait-for-verification state and the first firmware data is verified successfully.

9. The storage circuit of claim 8, wherein the boot state is changed from the wait-for-switch-code state to a to-execute-switch-code state if a switch code is received.

10. The storage circuit of claim 9, wherein the first firmware data or the second firmware data is executed if the boot state is a first operation state, wherein the boot data is executed if the boot state is a second operation state.

11. The storage circuit of claim 1, wherein the storage circuit is a flash memory.

12. An operation method, comprising:
generating first state data corresponding to first firmware data in a first storage region;
generating second state data corresponding to second firmware data in a second storage region;
executing the first firmware data based on the first state data;
updating the second firmware data when a firmware updating event occurs;
executing the updated second firmware data after the second firmware data is updated; and
updating the first firmware data when another firmware updating event occurs.

13. The operation method of claim 12, further comprising:
executing the first firmware data if the second firmware data is not updated successfully.

14. The operation method of claim 12, further comprising:
determining a first state of the first firmware data based on an update tag, a verify tag, a switch code tag, and a run tag of the first state data; and
determining a second state of the second firmware data based on an update tag, a verify tag, a switch code tag, and a run tag of the second state data.

15. The operation method of claim 14, further comprising:
determining a boot state based on the first state and the second state; and
executing the first firmware data or the second firmware data based on the boot state.

16. The operation method of claim 15, further comprising:
executing one of the first firmware data or the second firmware data if each of the first state and the second state is a valid state.

17. The operation method of claim 15, further comprising:
executing the first firmware data if the first state is a valid state and the second state is an invalid state or an illegal state.

18. The operation method of claim 15, further comprising:
changing the boot state from a wait-for-verification state to a wait-for-switch-code state if the boot state is the wait-for-verification state and the first firmware data is verified successfully.

19. The operation method of claim 18, further comprising:
changing the boot state from the wait-for-switch-code state to a to-execute-switch-code state if a switch code is received.

20. The operation method of claim 19, further comprising:
executing the first firmware data or the second firmware data if the boot state is a first operation state; and
executing the boot data if the boot state is a second operation state.

* * * * *